W. Johnson,
Shoe Shave.
Nº 21,760.   Patented Oct. 12, 1858.

UNITED STATES PATENT OFFICE.

WM. JOHNSON, OF HAMPSTEAD, NEW HAMPSHIRE.

TOOL FOR CHAMFERING SOLES FOR BOOTS AND SHOES.

Specification of Letters Patent No. 21,760, dated October 12, 1858.

*To all whom it may concern:*

Be it known that I, WILLIAM JOHNSON, of Hampstead, in the county of Rockingham and State of New Hampshire, have invented an Improved Tool for Chamfering Soles for Boots and Shoes; and I do hereby declare that the same is fully described and represented in the following specification and the accompanying drawings, of which—

Figure 1:
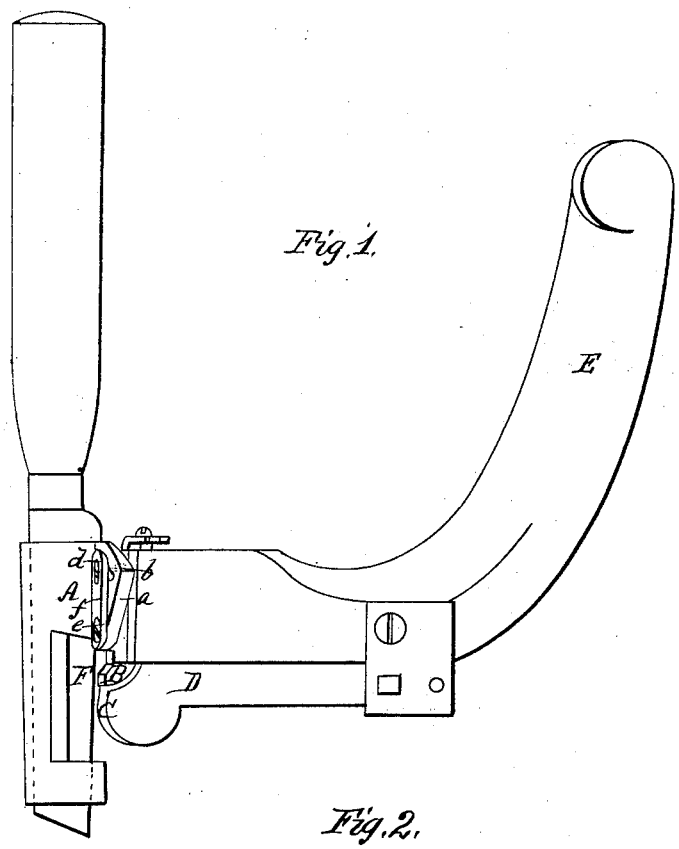
Figure 2:
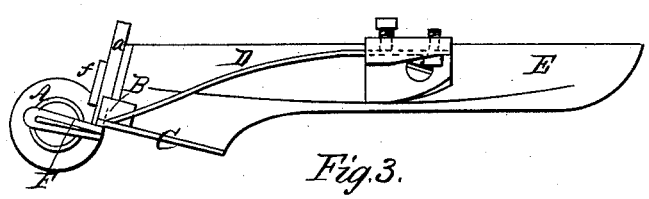
Figure 3:
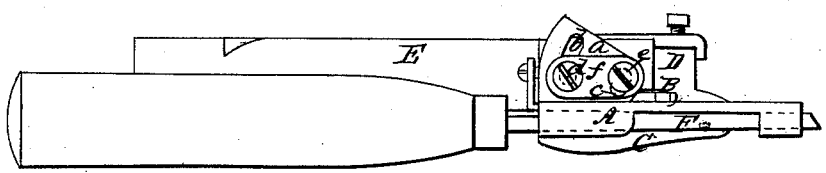

Figure 1, represents a top view; Fig. 2, a side elevation, and Fig. 3, a front end view of it.

My invention has reference to a tool composed of a knife holder A., a gage B., a rest C., a spring presser D, and a handle E, combined and arranged together as shown in the drawings, the knife holder being for the purpose of receiving and carrying a shoe making knife F which is placed in it in manner as represented in such drawings, and with its cutting edge against the edge gage B.

The nature of invention or improvement consists in constructing such a tool with means or devices not only for adjusting the angular position of the cutting edge with respect to the sole rest C., but the distance of the said cutting edge from the sole rest measured at the inner edge of the gage.

In applying the knife holder to the front end of the hand, were we to cause it merely to turn on a clamp screw, we should be able to adjust or vary the angle of the blade of the knife with respect to the bearing surface of the sole rest, but, we could not do this without either increasing or diminishing the distance of the knife at the front edge of the gage from the said rest, as a diminution of the angle would diminish the thickness of the sole at its edge when cut by the machine. It is desirable to have such means of adjustment as will enable the knife, for any desirable thickness of the edge of the sole to be varied in angular position with respect to the rest as circumstances may require. To accomplish this, I form through the holding lip, *a*, of the knife holder A, two curved slots, *b*, *c*, and pass a clamp screw, *d*, or *e*, through each and screw it into the handle such clamp screw being first carried through a washer or clamp plate, *f*, disposed as shown in the drawings. By such means, the proper adjustment of the knife can be effected.

I claim—

The improved chamfering tool, as constructed, with means not only of adjusting the angular position of the knife with respect to the sole rest, but the distance of the said edge, at the gage from the rest as described.

In testimony whereof, I have hereunto set my signature.

WM. JOHNSON.

Witnesses:
LUTHER WEBBER,
EBENR. HOYT.